No. 829,131. PATENTED AUG. 21, 1906.
W. WACHTER.
PROCESS FOR DECORATING GLASS SURFACES AND THE LIKE.
APPLICATION FILED SEPT. 15, 1905.
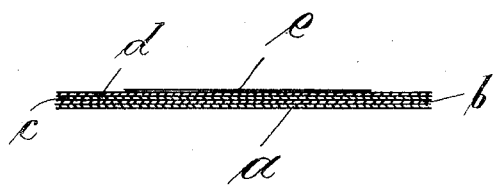
Witnesses:
Arthur Scholz
Emil Kayser
Inventor:
Wilhelm Wachter
by Robert Hepler
Attorney

UNITED STATES PATENT OFFICE.

WILHELM WACHTER, OF LEIPSIC-VOLKMARSDORF, GERMANY, ASSIGNOR TO MAX MAGDEBURG, OF ZEHLENDORF, PRUSSIA, GERMANY.

PROCESS FOR DECORATING GLASS SURFACES AND THE LIKE.

No. 829,131.     Specification of Letters Patent.     Patented Aug. 21, 1906.

Application filed September 15, 1905. Serial No. 278,599.

*To all whom it may concern:*

Be it known that I, WILHELM WACHTER, a subject of the King of Saxony, and a resident of 81 Eisenbahnstrasse, Leipsic-Volkmarsdorf, in the Kingdom of Saxony, German Empire, have invented a new and useful Process for Decorating Glass Surfaces and the Like, of which the following is an exact specification.

My invention relates to a process for decorating glass surfaces and like surfaces softening when heated to a comparatively low melting temperature. For carrying out this process hitherto an enamel has been applied upon the body, and then the decoration has been applied by means of a transfer-picture and then burned. To burn simultaneously the base and designs has not been possible, because the various parts of the design would flow into each other in the molten enamel.

The novelty of my invention consists therein that a transfer-picture is printed and burned at such a low temperature that the various picture parts do not run into each other, but nevertheless the parts combine solidly together and with the base. Such a transfer-picture is manufactured as follows: A flux smelting at a relatively low temperature—for example, 300° to 350° centigrade—is applied upon a collodion membrane or the like lying on paper and detachable therefrom. The flux is then powdered with glaze, preferably lead glaze. Upon this glaze layer the design is printed. The glaze layer must be rubbed with talc before being printed in order to prevent it from taking up color at the places where it is not covered by the picture. Printing is carried out by applying the flux and powdering on the colors. In case several colors are used the same are printed successively in the above-mentioned manner after the previous print is completely dried. The transfer-picture—for example, the bottle-label—is moistened with water and then applied with its collodion surface upon the surface to be decorated and the paper is withdrawn. If now the object thus treated is subjected to a higher temperature till the above-mentioned flux is melted, the same attaches the non-melting glaze and the print applied thereupon to the glass without causing the picture parts to swim. The melting temperature of the flux can almost reach the softening temperature of the glass, because the burning operation takes place immediately thereafter.

In order to make my invention clear, reference is made to the accompanying drawing, in which in section various layers are illustrated in exaggerated thickness. It designates *a* the paper, which carries a collodion membrane *b*, upon which the flux layer *c* is applied. *d* is the glaze layer, upon which the design *e* is printed. A flux, for example, can be used for bottle-glass softening at a temperature of 350°, the melting temperature of which is 320° to 350° centigrade, while the glaze melts when heated up to 1,000°. The decoration—for example, the bottle-label—thus manufactured has a matte surface. In order to impart gloss to the label, a new flux layer may be applied upon the picture layer.

Glass articles which are manufactured by pressing or blowing may be treated by placing the picture in the mold with its picture-surface against the mold and removing the paper before introducing the glass, or the transfer-picture is glued on the mold-wall, together with the paper, and then the glass is introduced. When burned, the paper is also consumed. In the latter case it is necessary to print the picture as a reversed image.

Having thus fully described the nature of this invention, what I desire to secure by Letters Patent of the United States is—

1. A transfer-picture for decorating glass surfaces and the like, consisting of a collodion membrane, a flux layer applied on the said membrane, a glaze layer and a picture, substantially as described.

2. A transfer-picture for decorating glass surfaces and the like, consisting of a collodion membrane, a flux layer applied on the said membrane, a glaze layer and a flux layer applied on the picture for imparting it gloss, substantially as described.

In witness whereof I have hereunto set my hand in the presence of two witnesses.

WILHELM WACHTER.

Witnesses:
   HENRY HASPER,
   WOLDEMAR HAUPT.